(12) United States Patent
Xiao et al.

(10) Patent No.: US 12,096,129 B2
(45) Date of Patent: Sep. 17, 2024

(54) MULTI-FRAME AUTO EXPOSURE CONTROL (AEC)

(71) Applicant: QUALCOMM Incorporated, San Diego, CA (US)

(72) Inventors: Zuguang Xiao, San Diego, CA (US); Lee-Kang Liu, San Diego, CA (US); Loic Francois Segapelli, San Diego, CA (US); Ho Sang Lee, San Diego, CA (US); Jiafu Luo, Irvine, CA (US); Wenbin Wang, San Diego, CA (US); Silei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/652,416

(22) Filed: Feb. 24, 2022

(65) Prior Publication Data

US 2023/0269486 A1 Aug. 24, 2023

(51) Int. Cl.
*H04N 23/741* (2023.01)
*H04N 23/73* (2023.01)
*H04N 23/743* (2023.01)

(52) U.S. Cl.
CPC ........... *H04N 23/741* (2023.01); *H04N 23/73* (2023.01); *H04N 23/743* (2023.01)

(58) Field of Classification Search
CPC .... H04N 23/741; H04N 23/73; H04N 23/743; H04N 23/71
See application file for complete search history.

(56) References Cited

U.S. PATENT DOCUMENTS 9,282,256 B1 * 3/2016 Shan ................... H04N 23/6811
9,883,119 B1 * 1/2018 Atanassov ................ G06T 5/73
(Continued)

FOREIGN PATENT DOCUMENTS

CN 113259587 A 8/2021
KR 20180045553 A 5/2018

OTHER PUBLICATIONS

International Search Report and Written Opinion—PCT/US2023/062910—ISA/EPO—May 15, 2023.
(Continued)

*Primary Examiner* — Chiawei Chen
(74) *Attorney, Agent, or Firm* — QUALCOMM Incorporated

(57) ABSTRACT

This disclosure provides systems, methods, and devices for image signal processing. In a first aspect, a method of image processing includes controlling an image sensor to capture image data for determining a standard dynamic range (SDR) representation of a scene, the image data comprising a first series of image frames captured with a first exposure level and a second series of image frames captured at a second exposure level. The SDR representation of the scene may be generated by determining a first output image frame based on at least a first image frame of the first series of image frames. Determining of an exposure level for the image sensor during the SDR image capture may be based on a second image frame of the second series of image frames captured by the image sensor in a multi-frame sensor configuration. Other aspects and features are also claimed and described.

36 Claims, 5 Drawing Sheets

(56) References Cited

U.S. PATENT DOCUMENTS

| | | | |
|---|---|---|---|
| 2008/0219585 A1* | 9/2008 | Kasai | H04N 25/589 |
| | | | 382/274 |
| 2010/0066858 A1* | 3/2010 | Asoma | H04N 23/60 |
| | | | 348/E5.037 |
| 2010/0328491 A1 | 12/2010 | Ovsiannikov | |
| 2011/0069200 A1* | 3/2011 | Oh | H04N 23/70 |
| | | | 348/E5.037 |
| 2014/0307117 A1* | 10/2014 | Feng | H04N 23/741 |
| | | | 348/218.1 |
| 2016/0173751 A1* | 6/2016 | Nakata | H04N 23/741 |
| | | | 348/362 |
| 2017/0374258 A1* | 12/2017 | Fujita | H04N 23/741 |
| 2018/0041724 A1* | 2/2018 | Kim | H04N 25/57 |
| 2018/0227479 A1 | 8/2018 | Parameswaran et al. | |
| 2018/0343390 A1* | 11/2018 | Duran | H04N 23/741 |
| 2019/0342511 A1* | 11/2019 | Zhao | H04N 23/80 |
| 2020/0053288 A1* | 2/2020 | Kim | H04N 23/667 |
| 2021/0185215 A1* | 6/2021 | Yuan | H04N 5/265 |
| 2021/0360139 A1* | 11/2021 | Mcelvain | H04N 25/583 |
| 2021/0400182 A1* | 12/2021 | Eagleston | H04N 23/80 |
| 2022/0138964 A1* | 5/2022 | Gintsburg | H04N 23/743 |
| | | | 382/103 |

OTHER PUBLICATIONS

Kao W.C., et al., "Robust Brightness Measurement and Exposure Control in Real-Time Video Recording", IEEE Transactions on Instrumentation and Measurement, IEEE, USA, vol. 60, No. 4, Apr. 1, 2011, pp. 1206-1216, XP011349560, ISSN: 0018-9456, DOI: 10.1109/TIM.2010.2087835, The whole document.

Wikipedia, "Multi-exposure HDR Capture", Jan. 27, 2022, 15 Pages, XP093042422, The whole document.

* cited by examiner

MULTI-FRAME AUTO EXPOSURE CONTROL (AEC)

TECHNICAL FIELD

Aspects of the present disclosure relate generally to image processing, and more particularly, to automatic exposure control (AEC). Some features may enable and provide improved image processing, including image capture with improved exposure determinations using multiple frames.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Conventional image sensors have a limited dynamic range, which may be smaller than the dynamic range of human eyes. Dynamic range refers to the light range between bright portions of an image and dark portions of an image. A conventional image sensor may increase an exposure level to improve detail in dark portions of an image at the expense of losing detail in bright portions of an image, which may become saturated and clipped as a result of the increased exposure level. Alternatively, a conventional image sensor may decrease an exposure level to improve detail in bright portions of an image at the expense of losing detail in dark portions of the image. Image capture devices must balance conflicting objectives, preserving detail in bright portions or dark portions of an image, by adjusting exposure level. The limited dynamic range of the image sensor is a challenge to determining an exposure level for capturing digital images.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An image sensor may be configured in a multi-frame sensor configuration to generate multiple image frames representing the scene captured at different exposure levels. One of the multiple captured image frames may be used to generate an output image frame that is the digital image previewed or saved by a user. An extra image frame generated by the image sensor in the multi-frame sensor configuration may be intentionally underexposed to allow better exposure level determination. The extra image frame may be used for automatic exposure control (AEC) that determines an exposure level for capturing the image frame used to generate the output image frame. The intentionally underexposed image frame may be considered a low-quality image by the user, but captures a different portion of the dynamic range of the scene, such that the exposure level determination better meets the desired objectives of the AEC algorithm.

The multi-frame sensor configuration may be applied to an image sensor as a high dynamic range (HDR) configuration. HDR photography may include capturing multiple image frames and fusing the image frames to improve the dynamic range of the photography by combining low light portions of one image frame captured at higher exposure with bright portions of another image frame captured at lower exposure. As described according to embodiments herein, the HDR sensor configuration may be used to improve the appearance of standard dynamic range (SDR) images. In some aspects, the sensor configuration may specify a lower resolution for the underexposed image frame to reduce power consumption because the exposure determination may not benefit or may only marginally benefit from a full-sensor resolution image frame. Multi-frame sensor configuration may refer to multiple frames captured by different image sensors, multiple frames captured sequentially by a single image sensor, or multiple frames captured concurrently by a single image sensor (such as during a staggered HDR (sHDR) read-out from an image sensor).

The use of a multi-frame image sensor configuration for SDR photography may be particularly beneficial when a rapid change in brightness level is expected. For example, when a user pans an image sensor from an indoor scene to an outdoor scene, the brightness level may rapidly increase due to the change from indoor lighting to outdoor lighting. The exposure determination may be difficult if the image sensor saturates and clips image data because the exposure determination does not have accurate data regarding the scene. In such a scenario, and certain other scenarios, the availability of an intentionally underexposed image frame for exposure determination may allow the exposure determination to more quickly converge on a desirable exposure level because the underexposed image frame does not have as much clipped image data.

In one aspect of the disclosure, a method for image processing includes controlling an image sensor (or one or more image sensors) to capture image data for determining a standard dynamic range (SDR) representation of a scene, the image data comprising a first series of image frames captured with a first exposure level and a second series of image frames captured at a second exposure level, wherein the second exposure level is lower than the first exposure level, and wherein the controlling comprises determining a first output image frame based on at least a first image frame of the first series of image frames; and determining an exposure level for the image sensor based on a second image frame of the second series of image frames.

In an additional aspect of the disclosure, an apparatus includes at least one processor and a memory coupled to the at least one processor. The at least one processor is configured to execute the processor-readable code to cause the at least one processor to perform operations including controlling an image sensor to capture image data for determining a standard dynamic range (SDR) representation of a scene, the image data comprising a first series of image frames captured with a first exposure level and a second series of image frames captured at a second exposure level, wherein the second exposure level is lower than the first exposure level, and wherein the controlling comprises determining a first output image frame based on at least a first image frame of the first series of image frames; and determining an exposure level for the image sensor based on a second image frame of the second series of image frames.

In an additional aspect of the disclosure, an apparatus includes means for controlling an image sensor to capture image data for determining a standard dynamic range (SDR) representation of a scene, the image data comprising a first series of image frames captured with a first exposure level and a second series of image frames captured at a second exposure level, wherein the second exposure level is lower than the first exposure level.

In an additional aspect of the disclosure, a non-transitory computer-readable medium stores instructions that, when executed by a processor, cause the processor to perform operations. The operations include controlling an image sensor to capture image data for determining a standard dynamic range (SDR) representation of a scene, the image data comprising a first series of image frames captured with a first exposure level and a second series of image frames captured at a second exposure level, wherein the second exposure level is lower than the first exposure level, and wherein the controlling comprises determining a first output image frame based on at least a first image frame of the first series of image frames; and determining an exposure level for the image sensor based on a second image frame of the second series of image frames.

In one aspect of the disclosure, a method for image processing includes controlling an image sensor with a first multi-frame sensor configuration to capture image data for determining a first representation of a scene, the image data comprising a first series of image frames captured with a first exposure level and a second series of image frames captured at a second exposure level; determining a first output image frame of the first representation of the scene based on at least a first image frame of the first series of image frames captured while the image sensor is configured with the first multi-frame sensor configuration; determining an exposure level for the image sensor based on a second image frame of the second series of image frames captured while the image sensor is configured with the first multi-frame sensor configuration; controlling the image sensor with a second multi-frame sensor configuration to capture second image data for determining a second representation of the scene, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the image sensor is configured with the second multi-frame sensor configuration.

In an additional aspect of the disclosure, an apparatus includes at least one processor and a memory coupled to the at least one processor. The at least one processor is configured to perform operations including controlling an image sensor with a first multi-frame sensor configuration to capture image data for determining a first representation of a scene, the image data comprising a first series of image frames captured with a first exposure level and a second series of image frames captured at a second exposure level; determining a first output image frame of the first representation of the scene based on at least a first image frame of the first series of image frames captured while the image sensor is configured with the first multi-frame sensor configuration; determining an exposure level for the image sensor based on a second image frame of the second series of image frames captured while the image sensor is configured with the first multi-frame sensor configuration; controlling the image sensor with a second multi-frame sensor configuration to capture second image data for determining a second representation of the scene, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the image sensor is configured with the second multi-frame sensor configuration.

In an additional aspect of the disclosure, an apparatus includes means for controlling an image sensor with a first multi-frame sensor configuration to capture image data for determining a first representation of a scene, the image data comprising a first series of image frames captured with a first exposure level and a second series of image frames captured at a second exposure level; means for determining a first output image frame of the first representation of the scene based on at least a first image frame of the first series of image frames captured while the image sensor is configured with the first multi-frame sensor configuration; means for determining an exposure level for the image sensor based on a second image frame of the second series of image frames captured while the image sensor is configured with the first multi-frame sensor configuration; means for controlling the image sensor with a second multi-frame sensor configuration to capture second image data for determining a second representation of the scene, the second image data comprising a third series of image frames captured with a third exposure level and a fourth series of image frames captured at a fourth exposure level; and means for determining a second output image frame of the second representation of the scene based on at least a third image frame of the third series of image frames and at least a fourth image frame of the fourth series of image frames while the image sensor is configured with the second multi-frame sensor configuration.

In an additional aspect of the disclosure, a non-transitory computer-readable medium stores instructions that, when executed by a processor, cause the processor to perform operations. The operations include controlling an image sensor with a first multi-frame sensor configuration to capture image data for determining a first representation of a scene, the image data comprising a first series of image frames captured with a first exposure level and a second series of image frames captured at a second exposure level; determining a first output image frame of the first representation of the scene based on at least a first image frame of the first series of image frames captured while the image sensor is configured with the first multi-frame sensor configuration; determining an exposure level for the image sensor based on a second image frame of the second series of image frames captured while the image sensor is configured with the first multi-frame sensor configuration; controlling the image sensor with a second multi-frame sensor configuration to capture second image data for determining a second representation of the scene, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the image sensor is configured with the second multi-frame sensor configuration.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS)

sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
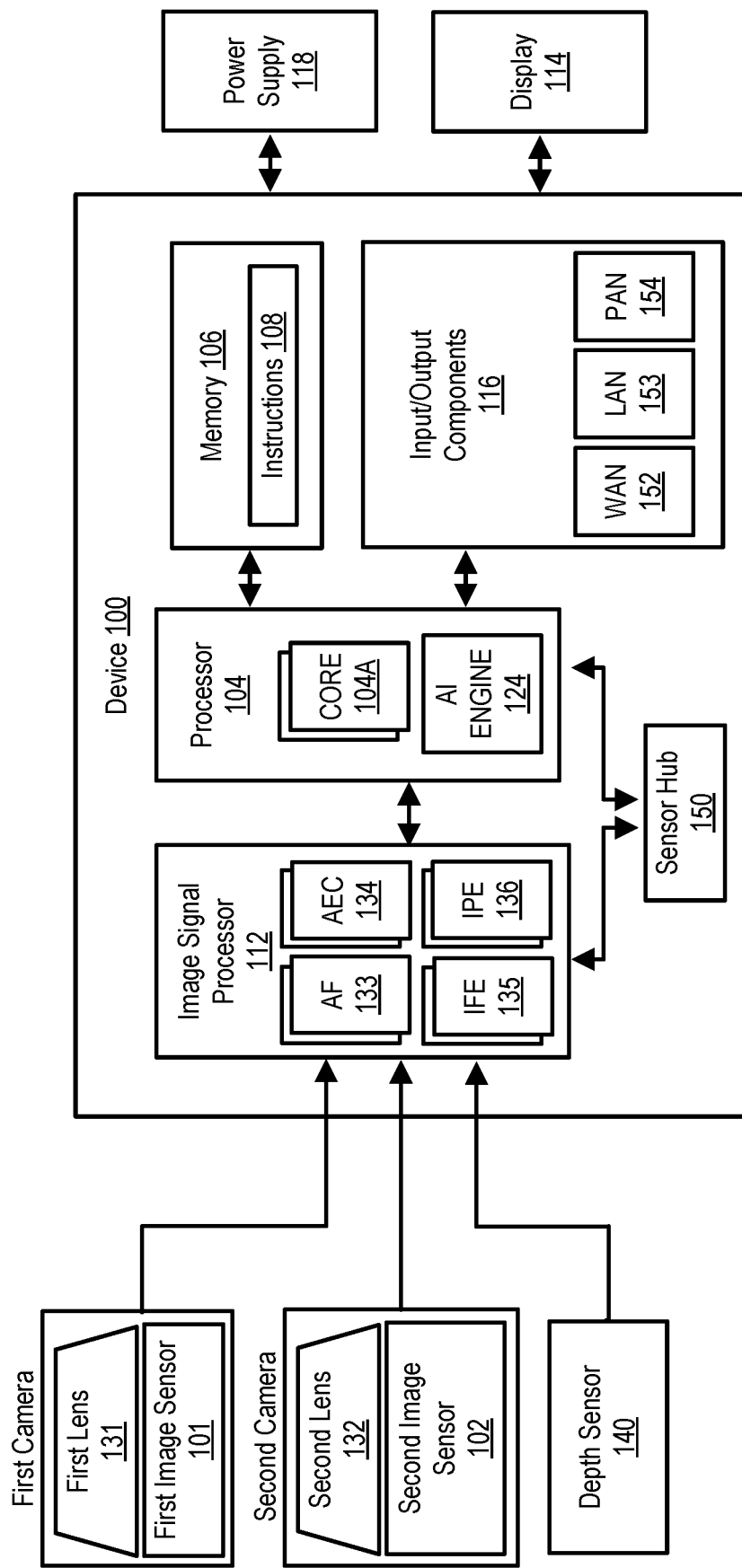
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved photography by using a multi-frame sensor configuration that provides intentionally underexposed image data from which to more accurately determine an exposure level for the photography. In some embodiments, the techniques may be used to improve standard dynamic range (SDR) photography, such as when an output image frame contains image data from a single captured image frame, by using a sensor configuration that provides intentionally underexposed image data for determining exposure level separate from other image data that is used to determine the output image frame.

Particular implementations of the subject matter described in this disclosure may be implemented to realize one or more of the following potential advantages or benefits. In some aspects, the present disclosure provides techniques for improving exposure level determination by reducing convergence time toward a target exposure level appropriate for the scene. For example, rapid changes in brightness levels of a scene may result in saturation of an image sensor. As a result of saturation, the image sensor may lose image data and be unable to determine an appropriate exposure level. In such a scenario, the exposure level is gradually reduced until the image sensor has sufficient data to determine the appropriate exposure level. Embodiments of this disclosure may provide extra image data captured at a different exposure level. This extra image data may not be used as the basis for the output photograph, but instead be used for determining an exposure level. When the extra image data is captured at a lower exposure level that does not saturate the image sensor during the scene change, the image capture device may converge faster on the appropriate exposure level by using the extra image data. The output photograph may thus have a higher image quality as viewed by a user or quantitatively measured as less saturation region, and the output photograph may be more quickly obtained.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include one or several transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensors 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure control (AEC) 134 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Exposure control of an image sensor can be improved through capturing an additional frame at a lower exposure level (e.g., a shorter exposure time), which may allow the exposure control to converge quicker, particularly in scenes with quick light level changes. For example, an automatic exposure control (AEC) system in one configuration may use image frames captured by an image sensor to change exposure levels to improve the quality of an image by obtaining image data at a desired brightness level. A rapid change in brightness level, such as an increase in brightness, may result in the image sensor saturating, which reduces the data available to the AEC for determining a new exposure level. The AEC then decreases exposure until more data is available from which the AEC may converge towards a target brightness. That is, at image sensor saturation the AEC does not have an accurate representation of the brightness of the scene because the image data is clipped. Thus, the AEC is not able to determine how far to decrease the exposure level for the new scene conditions. The AEC is slow to converge to a target exposure level under such conditions.

The AEC system may be configured to control exposure level based on a second image frame captured at a lower exposure level, which reduces the likelihood of saturation of the image sensor when capturing the second image frame. This second image frame thus provides a more accurate representation of the scene for determining exposure level by the AEC system. The second image frame may be captured using a high dynamic range (HDR) capture technique that captures two image frames of a scene at different exposure levels. In an HDR operation, both image frames are fused into an output image frame of higher dynamic range. According to embodiments of this disclosure, the fusion operation may be bypassed in a standard dynamic range (SDR) operation with one image frame used to determine an output image frame and another image frame used to determine an exposure level.

Figure 2:
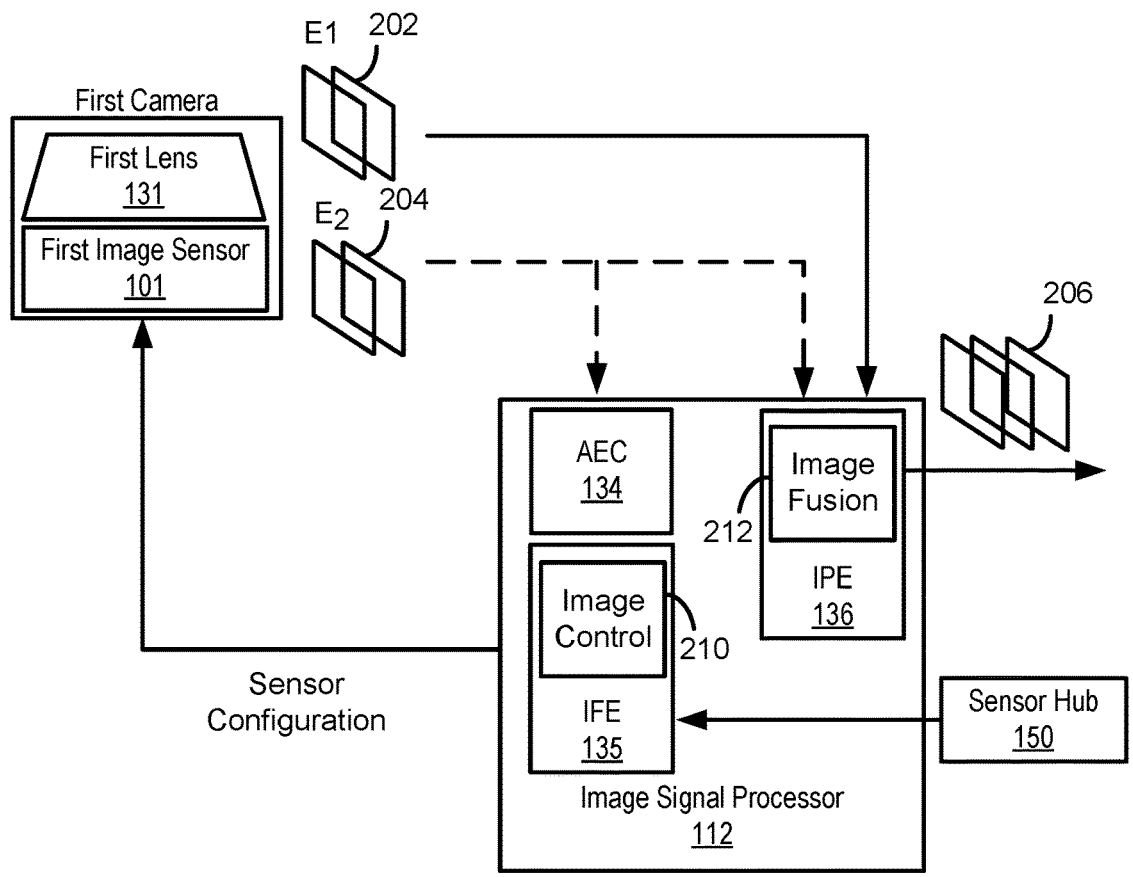
FIG. 2 is a block diagram illustrating a standard dynamic range (SDR) image capture operation with enhanced exposure control according to some embodiments of the disclosure.

One example operation for AEC using an image frame captured at a lower exposure level is shown in FIG. 2. FIG. 2 is a block diagram illustrating a standard dynamic range (SDR) image capture operation with enhanced exposure control according to some embodiments of the disclosure. The image signal processor 112, or another processor or logic circuit, may receive image data from the image sensor 101 and control the image sensor 101 by providing a sensor configuration to the image sensor 101. For example, the sensor configuration may command the image sensor 101 to capture alternating image frames at two different exposure levels. The processor 112 may then receive first and second image data including a first series of image frames 202 captured at a higher exposure level $E_1$ and a second series of image frames 204 captured at a lower exposure level $E_2$. The first and second series of image frames 202 and 204 may be output from the image sensor 101 in an interleaved such that first image data is followed by second image data, which is then followed by additional first image data and additional second image data.

The processor 112 may receive the image data from the image sensor 101 and demultiplex the image data into the first series of image frames for input to the IPE 136 and into a second series of image frames for input to the AEC 134. The image data may first be received and processed by IFE 135 prior to processing by the AEC 134 and/or the IPE 136. The IPE 136 may process the first series of image frames 202 to generate output image frames 206. The AEC 134 may process the second series of input frames 204 for determining an exposure level, with the processor 112 providing an updated sensor configuration to the image sensor 101 with the new exposure level. Subsequent pairs of image frames in the series of image frames 202 and 204 may be likewise processed by processor 112.

The lower exposure level of the second series of image frames 204 may improve the operation of AEC 134, which results in improved image quality of the output image frames 206 based on corresponding first series of image frames 202. The higher exposure level of the first series of image frames 202 upon which the output image frames 206 are based provide a representation of the scene that is more recognizable to a human eye. The multi-frame AEC control configuration may be beneficial when there is a rapid increase in brightness level of a scene captured by the image sensor 101. The rapid increase in brightness may saturate the image sensor 101 when capturing at the higher exposure level $E_1$ of the first set of image frames 202, but does not saturate the image sensor 101 when capturing the lower exposure level $E_2$ of the second set of image frames 204. The AEC 134, when receiving the non-saturated image frames, may quickly adjust the exposure level by providing a sensor configuration to the image sensor 101 that reduces the exposure level $E_1$ for capturing the first series of image frames 202, such that the output image frames 206 more accurately represent the scene.

Figure 3:
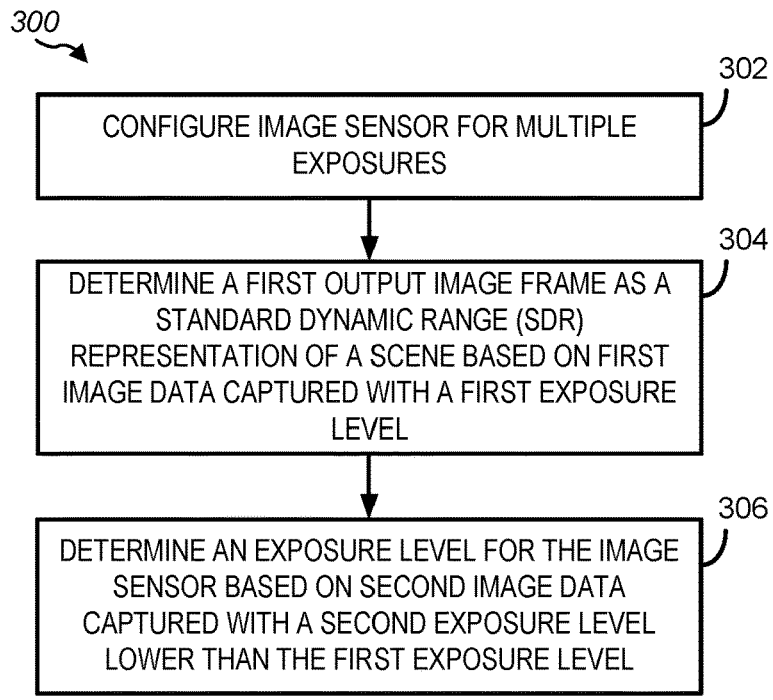
FIG. 3 is a flow chart illustrating a method for a standard dynamic range (SDR) image capture operation with enhanced exposure control according to some embodiments of the disclosure.

A method of capturing image frames according to the configuration of FIG. 2 is shown in FIG. 3. FIG. 3 is a flow chart illustrating a method for a standard dynamic range (SDR) image capture operation with enhanced exposure control according to some embodiments of the disclosure. The method 300 may include configuring an image sensor for multiple exposures at block 302. The configuration may be determined by the processor 112 and output to the image sensor 101. The configuration may include a specification of two exposure levels, along with other configuration data (such as image resolution). In some embodiments, the sensor configuration may specify a high dynamic range (HDR) configuration for the image sensor 101, such that two image frames are captured as though an HDR image were going to be formed from the two image frames.

In some embodiments, the sensor configuration may include more than two exposure levels for capturing three, four, five, or, more generally, N number of representations of the scene at different exposure levels or other different conditions. In response, the image sensor 101 may capture first image data at a first exposure level (e.g., a first exposure time) and capture second image data at a second exposure level (e.g., a second exposure time). Although the sensor configuration may be described as specifying exposure times, other values specifying an exposure level may additionally or alternatively be used in the sensor configuration. For example, the sensor configuration may specify a sensitivity for the image sensor 101 for defining an exposure level.

At block 304, the method 300 includes determining a first output image frame as a standard dynamic range (SDR) representation of a scene based on first image data captured at the first exposure level.

At block 306, the method 300 includes determining an exposure level for the image sensor based on second image data captured with the second exposure level that is lower than the first exposure level. The method 300 may then repeat by returning to block 302 to configure the image sensor based on the determined exposure level of block 306 and determining a new output image frame at block 304 at the new exposure level of block 306.

Returning to FIG. 2, the processor 112 may reconfigure the determination of output image frames 206. For example, an image control 210 of IFE 135 may monitor for one or more criteria being satisfied to reconfigure the processor 112 and update the sensor configuration for the image sensor 101. In some embodiments, the image control 210 may reconfigure image fusion 212 between, in a first configuration, determining the output image frames 206 based on the first series of image frames 202 alone and, in a second configuration, determining the output image frames 206 by fusing corresponding image frames of the first and second series of image frames 202 and 204. For example, when conditions indicate a higher dynamic range (e.g., above a threshold) in the scene, the image control 210 may configure image fusion 212 for a HDR fusion operation to determine output image frames 206. However, when conditions indicate a lower dynamic range (e.g., below a threshold) in the scene, the image control 210 may configure image fusion 212 to disable HDR fusion operation such that the output image frames 206 are based on a single image frame. The output image frames 206 being based on a single image frame, e.g., from the first series of image frames 202, may refer to the values of the output image frames 206 being determined from values of only the first series of image frames 202, although other operations involving control of the camera that affect the output image frames 206 may be based on the second series of image frames 204.

Disabling the HDR fusion operation in image fusion 212 of IPE 136 may reduce power consumption by the processor 112 when the scene does not benefit from high dynamic range. When the HDR fusion operation is disabled, the image sensor 101 may be configured to continue to capture first and second series of image frames 202 and 204 in a HDR configuration. The second series of image frames 204, instead of being processed by image fusion 212 in a HDR fusion operation, are processed in AEC 134 to determine an exposure level for the first series of image frames 202. Switching between HDR output image frames and SDR output image frames may continue based on one or more rules based on predetermined criteria.

Figure 4:
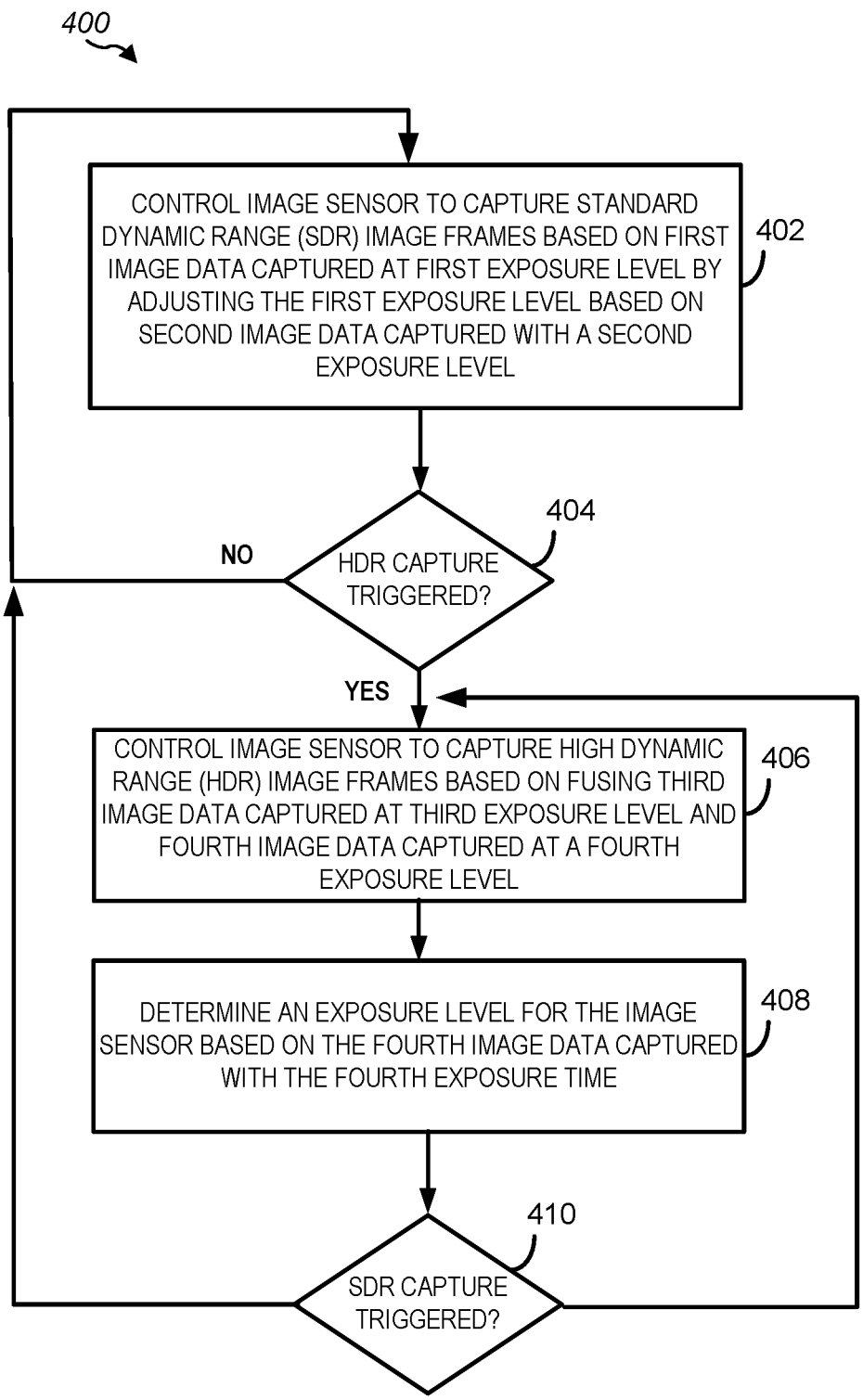
FIG. 4 is a flow chart illustrating a method for switching between standard dynamic range (SDR) image capture and high dynamic range (HDR) image capture operations according to some embodiments of the disclosure.

An example method of operation for switching sensor configurations is shown in FIG. 4. FIG. 4 is a flow chart illustrating a method for switching between standard dynamic range (SDR) image capture and high dynamic range (HDR) image capture operations according to some embodiments of the disclosure. A method 400 includes, at block 402, controlling an image sensor to capture SDR image frames based on first image data captured at a first exposure level and adjusting the exposure level based on second image data captured with a second exposure level. The processor may determine output SDR image frames during operation at block 402. The method 400 may include determining whether an HDR capture is triggered at block 404 while controlling the image sensor to capture SDR image frames at block 402. If HDR capture is not triggered, the method 400 continues at block 402 and 404 to generate photographs from one image frame while controlling exposure level using an extra image frame.

If HDR capture is triggered, the method 400 continues to block 406 to control the image sensor to capture HDR image frames based on fusing third image data captured at a third exposure level with fourth image data captured at a fourth exposure level. While capturing HDR image frames at block 406, an exposure level may be determined at block 408 for the image sensor based on the third and/or fourth image data. In some embodiments, the same image sensor configuration for capturing multiple image frames is used for the SDR photography of block 402 and the HDR photography of block 406. If SDR capture is not triggered at block 410 by predefined criteria, the method 400 continues to capture HDR image frames at block 406. If SDR capture is triggered, the method 400 returns to block 402 to control the image sensor to capture SDR image frames.

Figure 5A:
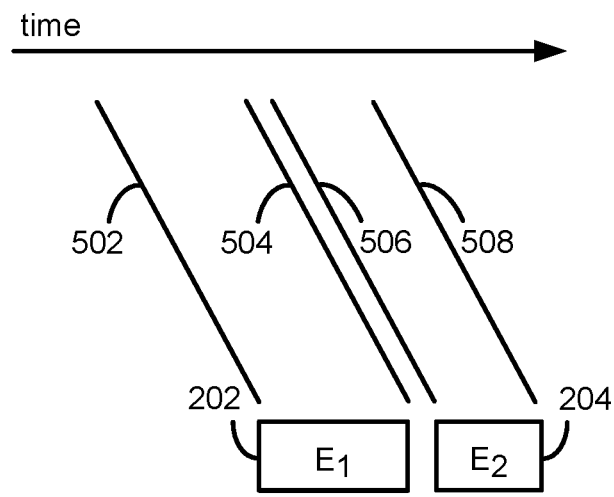
FIG. 5A is a block diagram illustrating a sensor configuration for multi-frame high dynamic range (MFHDR) image capture according to some embodiments of the disclosure.

Example sensor configurations for capturing two or more image frames in a multi-frame configuration from an image sensor with different exposure levels include multi-frame high dynamic range (MFHDR) configuration, less-blanking MFHDR (LB-MFHDR), and staggered HDR (sHDR). An example MFHDR configuration is shown in FIG. 5A, but other configurations for capturing multiple image frames of different exposure lengths may be implemented. FIG. 5A is a block diagram illustrating a sensor configuration for multi-frame high dynamic range (MFHDR) image capture according to some embodiments of the disclosure. The image sensor may reset at time 502 to begin a read-out operation, such as on a row-by-row basis, until the entire image sensor is read out at time 504, to generate a first image frame 202 with exposure level $E_1$. The image sensor may then reset at time 506 to begin a read-out operation, such as on a row-by-row basis, until the entire image sensor is read out at time 508, corresponding to read-out of a second image frame 204 with exposure level $E_2$.

Figure 5B:
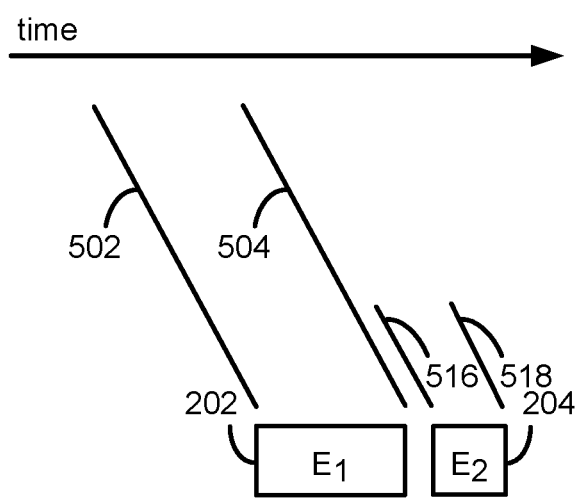
FIG. 5B is a block diagram illustrating a sensor configuration for multi-frame high dynamic range (MFHDR) image capture with different image frame resolutions according to some embodiments of the disclosure.

In some embodiments, the image frames may be captured at different image resolutions. For example, the second series of image frames 204 may be captured at a lower resolution. This may be advantageous, for example, when HDR fusion is disabled and the second series of image frames 204 is used for determining exposure levels for SDR photography. The exposure level determination may be made with lower-resolution image data to reduce power consumption. Image resolution may be reduced by configuring the image sensor for skipping or binning. An example image capture with reduced image resolution of extra image frames is shown in FIG. 5B. FIG. 5B is a block diagram illustrating a sensor configuration for multi-frame high dynamic range (MFHDR) image capture with different image frame resolutions according to some embodiments of the disclosure. A first image frame 202 is captured between times 502 and 504. A low-resolution second image frame 204 may be captured beginning with a reset at time 516 and ending at time 518. In some embodiments, assuming a full-resolution sensor has 4000 lines, the low-resolution image frame may use a combination of binning and skipping to merge eight image sensor lines into one output line, resulting in an output of 500 lines for the 4000-line image sensor. In some embodiments of an image sensor having a Bayer color pattern, the lower-resolution image frame read-out operation may merge sixteen lines into two lines to maintain the Bayer color filter pattern. Binning may include averaging multiple values from the image sensor into a single value for transmission and processing from the image sensor to the ISP. Skipping may include partially reading-out the image sensor, such that only some, rather than all, of the rows of the image sensor are transmitted and processed from the image sensor to the ISP.

Figure 6:
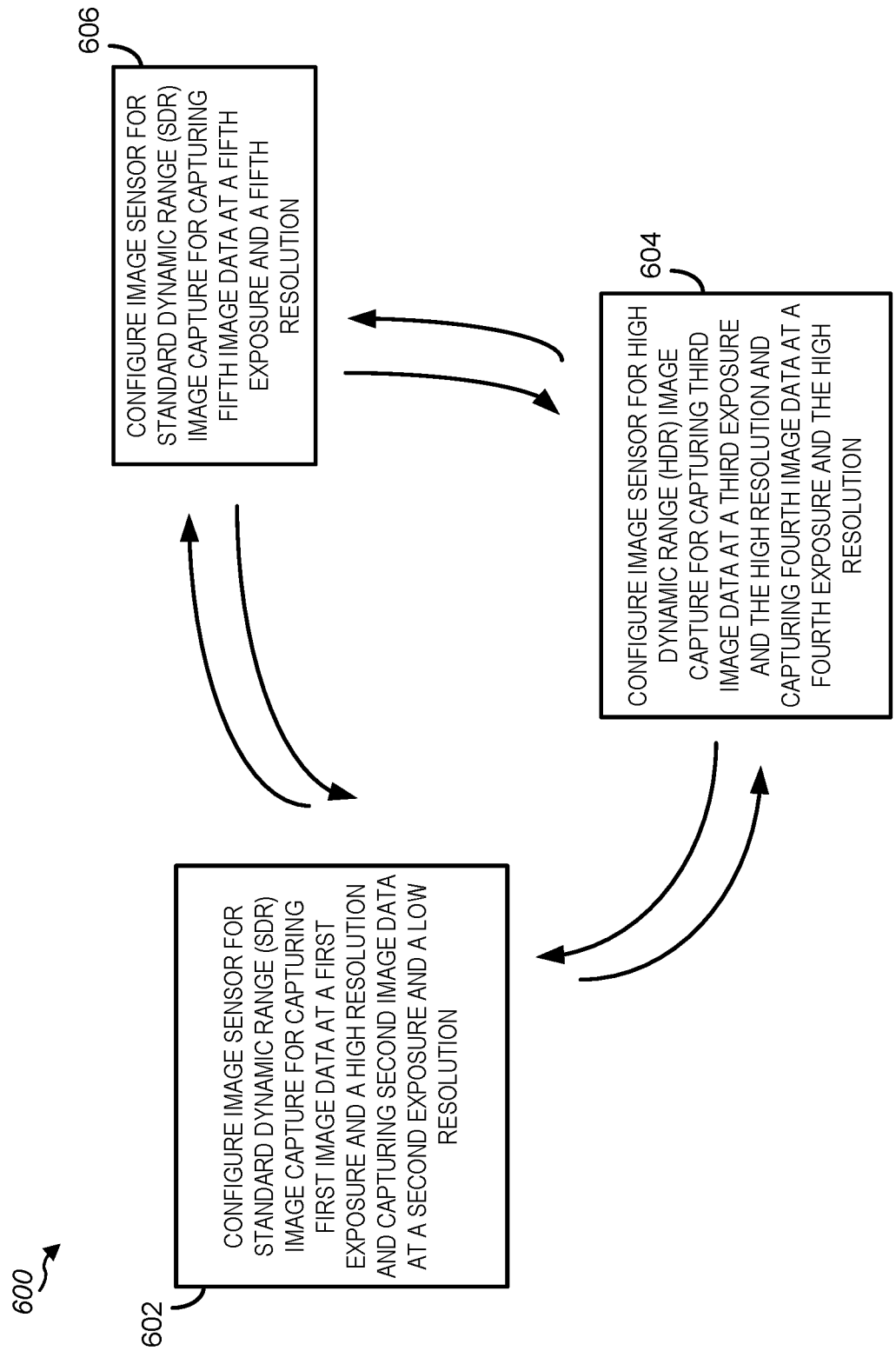
FIG. 6 is a flow chart illustrating a method of switching an image sensor for SDR and HDR image capture configurations according to some embodiments of the disclosure.

An example method for switching image resolution of the image sensor for capturing image frames between a first, lower resolution for SDR image capture and a second, higher resolution for HDR image capture. The image resolution may be changed for the capture of extra image frames for exposure determination when performing SDR photography. FIG. 6 is a flow chart illustrating a method of switching an image sensor for SDR and HDR image capture configurations according to some embodiments of the disclosure.

A method 600 includes, at block 602, configuring the image sensor for standard dynamic range (SDR) image capture for capturing first image data at a first, higher exposure level and a first, higher resolution and capturing second image data at a second, lower exposure level and a second, lower resolution.

In the embodiment of FIG. 2, the processor 112 may configure the image sensor 101 by transmitting an appropriate sensor configuration corresponding to block 602. In the configuration of block 602, the image sensor 101 may generate first series of image frames 202 at exposure level $E_1$ and a higher image resolution and generate second series of image frames 204 at exposure level $E_2$ and a lower image resolution. The processor 112 may use one image frame of the lower-resolution series of image frames 204 for exposure determination in AEC 134. The processor 112 may use a corresponding image frame of the higher-resolution series of image frames 202 for determining output image frames 206 in IPE 136 with image fusion 212 disabled.

The method 600 may also include, at block 604, configuring the image sensor for high dynamic range (HDR) image capture for capturing third image data at a third, higher exposure level and a third, higher resolution and capturing fourth image data at a fourth, lower exposure level and a fourth, higher resolution. The third and fourth resolutions may be equal in some embodiments, and, in some embodiments, the third and/or fourth resolutions may be equal to the first resolution of block 602.

In the embodiment of FIG. 2, the processor 112 may configure the image sensor 101 by transmitting an appropriate sensor configuration corresponding to block 604. In the configuration of block 604, the image sensor 101 may generate first series of image frames 202 at exposure level $E_1$, corresponding to the third exposure level, and generate second series of image frames 204 at exposure level $E_2$, corresponding to the fourth exposure level. The processor 112 may use one image frame of the first series of image frames 204 for exposure determination in AEC 134. The processor 112 may use that image frame and a corresponding image frame of the different-exposure-level series of image frames 202 for determining output image frames 206 in IPE 136 by enabling image fusion 212 in IPE 136.

The method 600 may further include, at block 606, configuring the image sensor for standard dynamic range (SDR) image capture for capturing fifth image data at a fifth exposure level and a fifth resolution. In some embodiments, the fifth resolution may be equal to the first resolution of block 602 and/or the third or fourth resolution of block 604. No extra image frames may be captured at block 606, such that the image sensor is not configured for multi-frame capture at block 606.

Image control 210 executing on IFE 135 may implement the method 600 of FIG. 6 in, for example, a state machine, for determining whether the processor 112 should perform SDR image capture or HDR image capture operations, and, when in SDR image capture operation whether to capture extra image frames for exposure determination, and further when in an SDR image capture operation whether to capture image frames at different resolutions or the same resolutions.

The image control 210 may use sensor data, such as from sensor hub 150, to determine one of the image sensor configurations of blocks 602, 604, or 606. For example, when sensor data, such as from an accelerometer or gyroscope, received from the sensor hub 150 indicates motion below a threshold amount of the image capture device, the processor 112 may configure image sensor 101 to perform SDR image capture without extra image frames for exposure control. As another example, when sensor data, such as from an accelerometer or gyroscope, received from the sensor hub 150 indicates a panning motion of the image capture device, the processor 112 may configure image sensor 101 to perform SDR image capture with extra image frames captured at lower exposure levels to be used for exposure control as in block 602. If the image capture device is operating on battery power and/or the battery charge level is below a threshold amount, the SDR image capture with extra image frames may be performed with the extra image frames captured at a lower resolution. If the image capture device is operating on an AC power source and/or the battery charge level is above a threshold amount, the SDR image capture with extra image frames may be performed with the extra image frames captured at a higher resolution, such as the same resolution of image frames used for determining the output image frame. As a further example, when a dynamic range of an image frame captured during SDR operation exceeds a threshold level the processor 112 may configure image sensor 101 to perform HDR image capture operation in block 604.

In some embodiments, HDR sensor configurations may capture three or more corresponding image frames, rather than two as described in the example embodiments above. Regardless of the number of image frames captured at an HDR sensor configuration, one of the image frames may be separated from the HDR fusion process and captured at a low exposure level and used for exposure determination. For example, an HDR sensor configuration for capturing three image frames of different exposure level may include capturing the third image frame at a low exposure level for exposure determination in AEC 134. The HDR fusion process may continue with two of the three image frames that were not provided to AEC 134. In other embodiments, four, five, six, or more (e.g., N) image frames may be captured in an HDR image capture operation with one image frame used for exposure determination and N−1 image frames used for HDR fusion.

In one or more aspects, techniques for supporting image capture and/or image processing may include additional aspects, such as any single aspect or any combination of aspects described below or in connection with one or more other processes or devices described elsewhere herein. In a first aspect, supporting image capture and/or image processing may include an apparatus configured to control an image sensor (or one or more image sensors) to capture image data for determining a standard dynamic range (SDR) representation of a scene, the image data comprising a first series of image frames captured with a first exposure level and a second series of image frames captured at a second exposure level, wherein the second exposure level is lower than the first exposure level. The apparatus is further configured to determine a first output image frame based on at least a first image frame of the first series of image frames; and/or determine an exposure level for the image sensor based on a second image frame of the second series of image frames. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image capture and/or image processing may include one or more operations described herein with reference to the apparatus.

In a second aspect, in combination with the first aspect, the apparatus is further configured to perform operations including configuring the image sensor to capture the second series of image frames at a second resolution lower than a first resolution of the first series of image frames.

In a third aspect, in combination with one or more of the first aspect or the second aspect, configuring the image sensor may include configuring the image sensor with a binning configuration.

In a fourth aspect, in combination with one or more of the first aspect through the third aspect, configuring the image sensor may include configuring the image sensor with a skipping configuration.

In a fifth aspect, in combination with one or more of the first aspect through the fourth aspect, the apparatus is further configured to perform operations including determining to capture a high dynamic range (HDR) representation of the scene; and controlling the image sensor to capture second image data based on determining to capture the HDR representation of the scene, the second image data comprising a third series of image frames captured with a third exposure level and a fourth series of image frames captured at a fourth exposure level, wherein the controlling comprises determining a second output image frame based on at least one image frame of the third series of image frames and at least one image frame of the fourth series of image frames.

In a sixth aspect, in combination with one or more of the first aspect through the fifth aspect, the apparatus is further configured to perform operations including determining to configure the image sensor with a HDR sensor configuration for controlling the image sensor to capture the image data for determining the standard dynamic range (SDR) representation of a scene, wherein the determining is based on sensor data; and the controlling the image sensor to capture image data for determining the standard dynamic range (SDR) representation of a scene is based on the determining to configure the image sensor with a HDR sensor configuration for controlling the image sensor to capture image data for determining the standard dynamic range (SDR) representation of a scene.

In a seventh aspect, in combination with one or more of the first aspect through the sixth aspect, determining the sensor data indicates a panning motion of the image sensor.

In an eighth aspect, in combination with one or more of the first aspect through the seventh aspect, determining to configure the image sensor with the HDR sensor configuration comprises determining to configure the image sensor with a multi-frame high dynamic range (MFHDR) configuration.

In a ninth aspect, in combination with one or more of the first aspect through the eighth aspect, the second exposure level generates an underexposed representation of the scene.

In a tenth aspect, in combination with one or more of the first aspect through the ninth aspect, values of the first output image frame are determined without reference to values of the second image frame.

In an eleventh aspect, in combination with one or more of the first aspect through the tenth aspect, an apparatus may include a processor configured for image capture and/or image processing by performing operations including controlling an image sensor with a first multi-frame sensor configuration to capture image data for determining a first representation of a scene, the image data comprising a first series of image frames captured with a first exposure level and a second series of image frames captured at a second exposure level; determining a first output image frame of the first representation of the scene based on at least a first image frame of the first series of image frames captured while the image sensor is configured with the first multi-frame sensor configuration; determining an exposure level for the image sensor based on a second image frame of the second series of image frames captured while the image sensor is configured with the first multi-frame sensor configuration; controlling the image sensor with a second multi-frame sensor configuration to capture second image data for determining a second representation of the scene, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the image sensor is configured with the second multi-frame sensor configuration.

In a twelfth aspect, in combination with one or more of the first aspect through the eleventh aspect, controlling the first image sensor with the first multi-frame sensor configuration comprises capturing the first series of image frames at a first image resolution and capturing the second series of image frames at a second image resolution lower than the first image resolution.

In a thirteenth aspect, in combination with one or more of the first aspect through the twelfth aspect, the apparatus is also configured to perform operations including controlling the image sensor with a third sensor configuration to capture third image data for determining a third representation of the scene, the third image data comprising a fifth series of image frames captured with a fifth exposure level; and determining a third output image frame based on at least a fifth image frame of the fifth series of image frames based on controlling the image sensor with the third sensor configuration.

In a fourteenth aspect, in combination with one or more of the first aspect through the thirteenth aspect, the apparatus is also configured to perform operations including determining at least a first criteria is satisfied; and controlling the image sensor to switch from the third sensor configuration to the first multi-frame sensor configuration based on determining the first criteria is satisfied.

In a fifteenth aspect, in combination with one or more of the first aspect through the fourteenth aspect, determining at least a first criteria is satisfied comprises determining a panning motion of the image sensor.

In a sixteenth aspect, in combination with one or more of the first aspect through the fifteenth aspect, the one or more image sensors includes at least two image sensors, and controlling the one or more image sensors to capture image data comprises receiving the first series of image frames from a first image sensor of the one or more image sensors and receiving the second series of image frames from a second image sensor of the one or more image sensors.

In a seventeenth aspect, combination with one or more of the first aspect through the sixteenth aspect, the one or more image sensors includes at least two image sensors, and controlling the one or more image sensors to capture image data comprises receiving the first series of image frames from a first set of rows of a first image sensor of the one or more image sensors and receiving the second series of image frames from a second set of rows of the first image sensor different from the first set of rows.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
controlling one or more image sensors to capture image data representing a standard dynamic range (SDR) representation of a scene, the image data comprising a first series of image frames captured with a first exposure level and a second series of image frames captured at a second exposure level, wherein the second exposure level is lower than the first exposure level, and wherein the controlling comprises:
determining a first output image frame based on at least a first image frame of the first series of image frames; and
determining an exposure level for the one or more image sensors based on a second image frame of the second series of image frames;
determining to capture a high dynamic range (HDR) representation of the scene; and
controlling the one or more image sensors to capture second image data based on determining to capture the HDR representation of the scene, the second image data comprising a third series of image frames captured with a third exposure level and a fourth series of image frames captured at a fourth exposure level, wherein the controlling comprises:
determining a second output image frame based on at least one image frame of the third series of image frames and at least one image frame of the fourth series of image frames.

2. The method of claim 1, further comprising:
configuring the one or more image sensors to capture the second series of image frames at a second resolution lower than a first resolution of the first series of image frames.

3. The method of claim 2, wherein configuring the one or more image sensors at the second resolution comprises configuring the one or more image sensors with a binning configuration.

4. The method of claim 2, wherein configuring the one or more image sensors at the second resolution comprises configuring the one or more image sensors with a skipping configuration.

5. The method of claim 1, wherein controlling the one or more image sensors to capture image data comprises receiving the first series of image frames from a first image sensor of the one or more image sensors and receiving the second series of image frames from a second image sensor of the one or more image sensors.

6. The method of claim 1, wherein controlling the one or more image sensors to capture image data comprises receiving the first series of image frames from a first set of rows of a first image sensor of the one or more image sensors and receiving the second series of image frames from a second set of rows of the first image sensor different from the first set of rows.

7. The method of claim 1, further comprising:
determining to configure the one or more image sensors with a HDR sensor configuration for controlling the one or more image sensors to capture the image data for determining the standard dynamic range (SDR) representation of a scene, wherein:
the determining is based on sensor data; and
the controlling the one or more image sensors to capture image data for determining the standard dynamic range (SDR) representation of a scene is based on the determining to configure the one or more image sensors with a HDR sensor configuration for controlling the one or more image sensors to capture image data for determining the standard dynamic range (SDR) representation of a scene.

8. The method of claim 7, wherein the determining comprises determining the sensor data indicates a panning motion of the one or more image sensors.

9. The method of claim 7, wherein determining to configure the one or more image sensors with the HDR sensor configuration comprises determining to configure the one or more image sensors with a multi-frame high dynamic range (MFHDR) configuration.

10. The method of claim 1, wherein the second exposure level generates an underexposed representation of the scene.

11. The method of claim 10, wherein values of the first output image frame are determined without reference to values of the second image frame.

12. An apparatus, comprising:
a memory storing processor-readable code; and
at least one processor coupled to the memory, the at least one processor configured to execute the processor-readable code to cause the at least one processor to perform operations including:

controlling one or more image sensors to capture image data representing a standard dynamic range (SDR) representation of a scene, the image data comprising a first series of image frames captured with a first exposure level and a second series of image frames captured at a second exposure level, wherein the second exposure level is lower than the first exposure level, and wherein the controlling comprises:
- determining a first output image frame based on at least a first image frame of the first series of image frames; and
- determining an exposure level for the one or more image sensors based on a second image frame of the second series of image frames determining to capture a high dynamic range (HDR) representation of the scene; and controlling the one or more image sensors to capture second image data based on determining to capture the HDR representation of the scene, the second image data comprising a third series of image frames captured with a third exposure level and a fourth series of image frames captured at a fourth exposure level, wherein the controlling comprises:
- determining a second output image frame based on at least one image frame of the third series of image frames and at least one image frame of the fourth series of image frames.

13. The apparatus of claim 12, wherein the processor is further configured to cause the at least one processor to perform operations including:
configuring the one or more image sensors to capture the second series of image frames at a second resolution lower than a first resolution of the first series of image frames.

14. The apparatus of claim 13, wherein configuring the one or more image sensors at the second resolution comprises configuring the one or more image sensors with a binning configuration.

15. The apparatus of claim 13, wherein configuring the one or more image sensors at the second resolution comprises configuring the one or more image sensors with a skipping configuration.

16. The apparatus of claim 12, wherein controlling the one or more image sensors to capture image data comprises receiving the first series of image frames from a first image sensor of the one or more image sensors and receiving the second series of image frames from a second image sensor of the one or more image sensors.

17. The apparatus of claim 12, wherein controlling the one or more image sensors to capture image data comprises receiving the first series of image frames from a first set of rows of a first image sensor of the one or more image sensors and receiving the second series of image frames from a second set of rows of the first image sensor different from the first set of rows.

18. The apparatus of claim 12, wherein the processor is further configured to cause the at least one processor to perform operations including:
determining to configure the one or more image sensors with a HDR sensor configuration for controlling the one or more image sensors to capture the image data for determining the standard dynamic range (SDR) representation of a scene, wherein:
the determining is based on sensor data; and
the controlling the one or more image sensors to capture image data for determining the standard dynamic range (SDR) representation of a scene is based on the determining to configure the one or more image sensors with a HDR sensor configuration for controlling the one or more image sensors to capture image data for determining the standard dynamic range (SDR) representation of a scene.

19. The apparatus of claim 18, wherein the determining comprises determining the sensor data indicates a panning motion of the one or more image sensors.

20. The apparatus of claim 18, wherein determining to configure the one or more image sensors with the HDR sensor configuration comprises determining to configure the one or more image sensors with a multi-frame high dynamic range (MFHDR) configuration.

21. The apparatus of claim 12, wherein the second exposure level generates an underexposed representation of the scene.

22. The apparatus of claim 21, wherein values of the first output image frame are determined without reference to values of the second image frame.

23. The apparatus of claim 12, wherein the at least one processor comprises an image signal processor coupled to the one or more image sensors.

24. A method, comprising:
controlling one or more image sensors with a first multi-frame sensor configuration to capture image data for a first representation of a scene, the image data comprising a first series of image frames captured with a first exposure level and a second series of image frames captured at a second exposure level;

determining a first output image frame of the first representation of the scene based on at least a first image frame of the first series of image frames captured while the one or more image sensors is configured with the first multi-frame sensor configuration;

determining an exposure level for the one or more image sensors based on a second image frame of the second series of image frames captured while the one or more image sensors is configured with the first multi-frame sensor configuration;

controlling the one or more image sensors to switch to a second multi-frame sensor configuration to capture second image data for determining a second representation of the scene based on a measure of motion of the one or more image sensors compared to a threshold value, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the one or more image sensors is configured with the second multi-frame sensor configuration.

25. The method of claim 24, wherein controlling the first image sensor with the first multi-frame sensor configuration comprises capturing the first series of image frames at a first image resolution and capturing the second series of image frames at a second image resolution lower than the first image resolution.

26. The method of claim 24, further comprising:
controlling the one or more image sensors to switch to a third sensor configuration to capture third image data for determining a third representation of the scene, the third image data comprising a fifth series of image frames captured with a fifth exposure level; and determining a third output image frame based on at least a fifth image frame of the fifth series of image frames based on controlling the one or more image sensors with the third sensor configuration.

27. The method of claim 26, further comprising:

determining at least a first criteria is satisfied; and controlling the one or more image sensors to switch from the third sensor configuration to the first multi-frame sensor configuration based on determining the first criteria is satisfied.

28. The method of claim 27, wherein determining at least a first criteria is satisfied comprises determining a panning motion of the one or more image sensors.

29. The method of claim 24, wherein controlling the one or more image sensors comprises receiving the first series of image frames from a first image sensor of the one or more image sensors and receiving the second series of image frames from a second image sensor of the one or more image sensors.

30. The method of claim 24, wherein controlling the one or more image sensors comprises receiving the first series of image frames from a first set of rows of a first image sensor of the one or more image sensors and receiving the second series of image frames from a second set of rows of the first image sensor different from the first set of rows.

31. An apparatus, comprising:

a memory storing processor-readable code; and at least one processor coupled to the memory, the at least one processor configured to execute the processor-readable code to cause the at least one processor to perform operations including:

controlling one or more image sensors with a first multi-frame sensor configuration to capture image data for determining a first representation of a scene, the image data comprising a first series of image frames captured with a first exposure level and a second series of image frames captured at a second exposure level;

determining a first output image frame of the first representation of the scene based on at least a first image frame of the first series of image frames captured while the one or more image sensors is configured with the first multi-frame sensor configuration;

determining an exposure level for the one or more image sensors based on a second image frame of the second series of image frames captured while the one or more image sensors is configured with the first multi-frame sensor configuration;

controlling the one or more image sensors to switch to a second multi-frame sensor configuration to capture second image data for determining a second representation of the scene based on a measure of motion of the one or more image sensors compared to a threshold value, the second image data comprising a third series of image frames captured with a third exposure level and a fourth series of image frames captured at a fourth exposure level; and determining a second output image frame of the second representation of the scene based on at least a third image frame of the third series of image frames and at least a fourth image frame of the fourth series of image frames while the one or more image sensors is configured with the second multi-frame sensor configuration.

32. The apparatus of claim 31, wherein controlling the one or more image sensors with the first multi-frame sensor configuration comprises capturing the first series of image frames at a first image resolution and capturing the second series of image frames at a second image resolution lower than the first image resolution.

33. The apparatus of claim 31, wherein the at least one processor is further configured to perform operations including:

controlling the one or more image sensors to switch to a third sensor configuration to capture third image data for determining a third representation of a scene, the third image data comprising a fifth series of image frames captured with a first exposure level; and determining a third output image frame based on at least a fifth image frame of the fifth series of image frames based on controlling the one or more image sensors with the third sensor configuration.

34. The apparatus of claim 33, wherein the at least one processor is further configured to perform operations including:

determining at least a first criteria is satisfied, wherein determining at least a first criteria is satisfied comprises determining a panning motion of the one or more image sensors; and controlling the one or more image sensors to switch from the third sensor configuration to the first multi-frame sensor configuration based on determining the first criteria is satisfied.

35. The apparatus of claim 31, wherein controlling the one or more image sensors comprises receiving the first series of image frames from a first image sensor of the one or more image sensors and receiving the second series of image frames from a second image sensor of the one or more image sensors.

36. The apparatus of claim 31, wherein controlling the one or more image sensors comprises receiving the first series of image frames from a first set of rows of a first image sensor of the one or more image sensors and receiving the second series of image frames from a second set of rows of the first image sensor different from the first set of rows.

\* \* \* \* \*